United States Patent

[11] 3,627,831

| [72] | Inventors | Helmut Huber-Emden<br>Basel;<br>Paul Schaefer, Riehen; Arthur Maeder,<br>Therwil, all of Switzerland |
|---|---|---|
| [21] | Appl. No. | 810,365 |
| [22] | Filed | Mar. 25, 1969 |
| [45] | Patented | Dec. 14, 1971 |
| [73] | Assignee | Ciba Limited<br>Basel, Switzerland |
| [32] | Priority | Apr. 1, 1965 |
| [33] | | Switzerland |
| [31] | | 4510/65<br>Continuation-in-part of application Ser. No. 536,265, Mar. 22, 1966, now abandoned.<br>This application Mar. 25, 1969, Ser. No. 810,365 |

[54] CARBOXYLIC ACID AMIDES
8 Claims, No Drawings

[52] U.S. Cl. .................................................. 260/562 P,
260/4 AR, 260/33.6 PQ, 260/33.8 R, 260/41 R,
260/45.9 R, 260/47 UA, 260/248 CS, 260/519,
260/562 A, 260/830 P, 260/897 C, 260/897 B,
260/897 R, 424/324, 117/124 E, 117/128.4,
117/140 A, 117/145

[51] Int. Cl. .................................................... C07c 103/30
[50] Field of Search ........................................... 260/562,
521, 519

[56] References Cited
UNITED STATES PATENTS

| 3,433,835 | 3/1969 | Muller et al. ................. | 260/562 |
| 2,710,299 | 6/1955 | Kottler ......................... | 260/562 |
| 3,457,328 | 7/1969 | Blatz et al. .................... | 260/562 |

FOREIGN PATENTS

| 1,457,152 | 9/1966 | France ......................... | 260/562 |
| 1,475,097 | 2/1967 | France ......................... | 260/562 |

Primary Examiner—Henry R. Jiles
Assistant Examiner—Harry I. Moatz
Attorneys—Harry Goldsmith, Joseph G. Kolodny and Mario A. Monaco

ABSTRACT: Carboxylic acid arylmethylamides useful as antioxidants, bactericides and monomers for the production of polymers, which by themselves are useful as stabilizers for natural rubber and polypropylene and as components in coating preparations.

CARBOXYLIC ACID AMIDES

CROSS-REFERENCE

This application is a continuation-in-part of applicant's copending application Ser. No. 536,265, filed Mar. 22, 1966, now abandoned, the disclosure of which is relied on and incorporated by reference in this application.

The subject of the present invention is new carboxylic acid arylmethylamides which may be used for various purposes, for example the compound of formula (1) 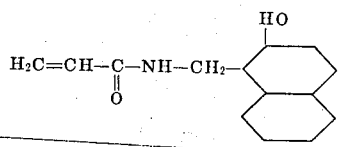

The carboxylic acid amides correspond to the formula (2) 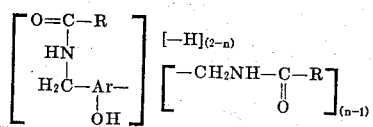

In this formula R denotes an ethylenically unsaturated residue of two to four carbon atoms, Ar an aromatic residue bonded to the —$CH_2$ groups by means of a ring carbon atoms and $n$ a positive integer having a value of not greater than two.

The carboxylic acid amides of formula (2) are compounds in which a residue of a monocarboxylic acid methylamide is bonded to a hydroxyaryl residue ($n=1$), or compounds in which two residues of a monocarboxylic acid methylamide are bonded to a hydroxyaryl residue ($n=2$). THe compounds thus correspond to one of formulas (3) and (4)

(3) 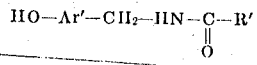

in which R' denotes an ethylenically unsaturated residue having two to three carbon atoms and Ar' denotes an aromatic residue bonded to the —$CH_2$ group by a ring carbon atoms;

(4) 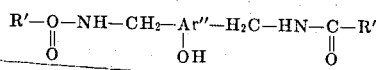

in which R' denotes an ethylenically unsaturated residue of two to three carbon atoms and Ar'' an aromatic residue bonded to the —$CH_2$ groups by a ring carbon atoms. Preferred carboxylic acid arylmethylamides correspond to the formula (5) 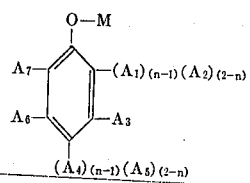

in which M represents a hydrogen atoms or a methyl group, $A_1$ represents a member selected from the group consisting of a $CH_2$ CH—CO—NH—$CH_2$—

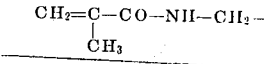

and HOOC— radical, $A_2$ represents and alkyl radical having at most four carbon atoms, $A_3$ and $A_6$ each represents a member selected from the group consisting of a hydrogen atom an alkyl radical having at most four carbon atoms, a $CH_2$=CH—CO—NH—$CH_2$—and a $CH_2$=C—CO—NH—$CH_2$—

group, $A_4$ represents a member selected from the group consisting of an alkyl radical containing at most four carbon atoms, a chlorine atom a nitro-, methylmercapto, $CH_2$=CH—CO—NH—$CH_2$— and $CH_2$=C—CO—NH—$CH_2$— group.
                                                                 |
                                                                $CH_3$ $A_5$ represents a member selected from the group consisting of an alkyl radical having at most four carbon atoms, a chlorine atom, a nitro group and a methylmercapto group, $A_7$ represents a member selected from the group consisting of a hydrogen atom, a chlorine atom an alkyl radical having at most four carbon atoms, a nitro-, methylmercapto-, hydroxyl-, $CH_2$=CH—CO—NH—$CH_2$— and $CH_2$=C—CO—NH—
                                                                                           |
                                                                                          $CH_3$ $CH_2$— group, $A_3$ and $A_4$ together may make up a condensed-on benzene ring, $n$ if one or two, at least one of the substituents $A_1$, $A_3$, $A_4$, $A_6$ and $A_7$ being a $CH_2$=CH—CO—NH—$CH_2$— or a $CH_2$=C—CO—NH—$CH_2$— group.
                                                        |
                                                       $CH_3$ Carboxylic acid arylmethylamides corresponding to the formula (6) 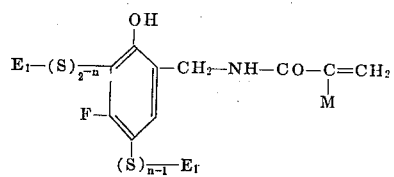

in which M represents a hydrogen atom or a methyl group, E represents a hydrogen atom of a $CH_2$=C—CO—NH—$CH_2$—
    |
    M group, $E_1$ is a lower alkyl radical, preferably having one to five carbon atoms, and $n$ is one or two, are very useful as stabilizers.

Of special interest are the compounds of the formulas (7) 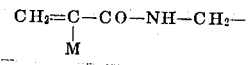

(8) 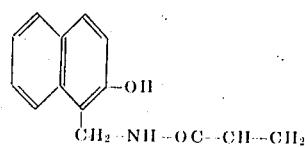

(9) 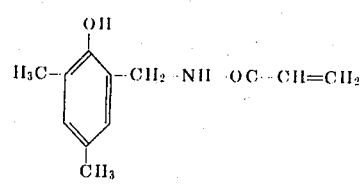

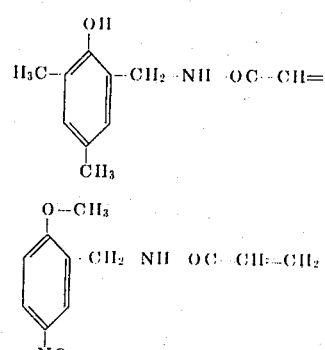

(10) 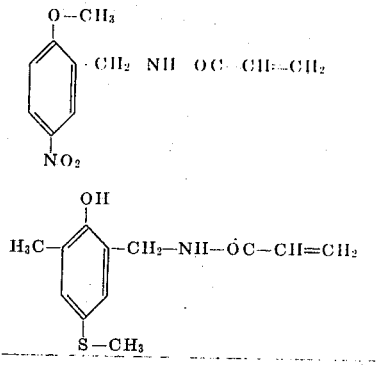

and

(11)
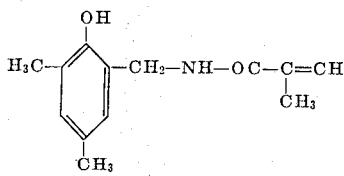

The carboxylic acid amides of the composition initially described may be produced by methods which are in themselves known, by reacting a N-methylolamide of an ethylencially unsaturated polymerizable acid in an acid reaction medium with an optionally etherified hydroxyaryl compound.

Depending on the selection of the starting substances and the ratio of the molecular amounts of the reaction components, carboxylic acid amides of formulas (3) or (4) may be obtained. Thus for example compounds of formula (3) are obtained from N-methylolamides of unsaturated monocarboxylic acids and hydroxyaryl compounds having a single reactive position, such as 2-hydroxynaphthalene or 1-hydroxy-2,4-dimethylbenzene. If monocarboxylic acid N-methylolamides are reacted with hydroxyaryl compounds having two reactive positions such as 1-hydroxy-2-chlorobenzene or 2,6-dihydroxynaphthalene, then depending on the ratio of the amounts of starting substances, compounds of formula (3) and/or compounds of formula (4) may be obtained.

As examples of N-methylolamides which may be used in the production of the new carboxylic acid arylmethylamides there may be mentioned the N-methylolamides of the following polymerizable carboxylic acids, polymerizable acids to be understood as homopolymerizable and/or copolymerizable acids crotonic acid, α-chloracylic acid, α-ethylacrylic acid, methacrylic acid and especially acrylic acid.

The hydroxyaryl compounds which serve for the production of the carboxylic acid arylmethylamides are free of heterocyclic rings, that is to say all ring members of these compounds are carbon atoms. The hydroxyaryl compounds may contain one or more aromatic six-membered rings which may be condensed with one another or may not be condensed, one or more optionally etherified hydroxyl groups, and, if desired, also further substituents, for example alkyl groups such as methyl or ethyl or tertiary butyl, alkoxy groups such as methoxy, halogen atoms such as fluorine, bromine or chlorine, trifluoromethyl groups, alkyl-S, carboxylic acid or nitro groups. Possible hydroxyl compounds are for example those of the phenanthrene or anthracene series, but especially those of the naphthalene or benzene series, As examples there may individually be mentioned: 2-hydroxyanthracene, 2-hydroxynaphthalene, 1-hydroxy-4-methylnaphthalene, 1-hydroxy-5,8-dichloronaphthalene, 2,6 or 2,7-dihydroxynaphthalene, 1-hydroxy-2-, -3- or -4-methyl-benzene, 1-methoxy-2-, -3- or -4-methylbenzene, 1-hydroxy-2-, -3- or -4-chlorobenzene, 1-hydroxy-4-bromobenzene, 1-hydroxy-4-fluorobenzene, 1-hydroxy-4-n-butylbenzene, 1-hydroxy-4-tertiary butylbenzene, 1-hydroxy-4-isobutylbenzene, 1-hydroxy-4-isohexylbenzene, 1-hydroxy-4-isooctylbenzene, 1-hydroxy-4-nonylbenzene, 1-hydroxy-2,4- or -2,6-dimethylbenzene, 1-hydroxy-2-methyl-4-tertiary butyl benzene, 2- or 4-hydroxy-diphenyl (1,1'), 3-hydroxy-diphenyl ether (1,1'), 1-hydroxy-4-cyclohexylbenzene, 1-hydroxy-2-, -3- or -4-methoxybenzene, 1-hydroxy-3,4,6-trichlorobenzene, 1,4-dihydroxy-3,5-di-tertiary butyl benzene, 1-hydroxy-2-methyl-4-sec. alkylbenzenes (obtainable by alkylation of 1-hydroxy-2-methylbenzene with a mixture of olefines of composition $C_8H_{16}$ to $C_{14}H_{28}$, in the presence of perchloric acid), 3-hydroxy-p-cymene (thymol), 1-hydroxy-2-methyl-5-isopropylbenzene (carvacrol), 1-hydroxy-2-methoxybenzene, 1-hydroxy-2,4- or -2,6-di-tertiary butyl benzene, 1-hydroxy-3-trifluoromethylbenzene, 1-hydroxy-2-methylmercapto-4-methylbenzene.

As has already been mentioned, the new carboxylic acid arylmethylamides are obtained by reaction of the carboxylic acid methylolamides with hydroxyaryl compounds in an acid medium. The acid reaction medium is appropriately obtained by adding a strong mineral acid such as hydrochloric acid, sulfuric acid, orthophosphoric acid or pyrophosphoric acid, or may also be obtained with acetic acid or phosphoric acid/boron fluoride complexes. It is generally advisable to work in an organic solvent, and a solvent which is easily soluble in water, or is soluble in water in all proportions, for example ethanol or glacial acetic acid, is advantageously used. The water content of the reaction mixture should be kept as low as possible. However the addition of a small amount of water, as for example results if concentrated hydrochloric acid is used in order to achieve an acid medium, is generally of no disadvantage. Warming the reaction mixture is generally unnecessary; it suffices to leave the mixture for a prolonged period, for example 20 to 100 hours, if possible with exclusion of air. The addition of an inhibitor, for example thiodiphenylamine (thiophenazine) is also advisable.

The new carboxylic acid arylmethylamides are valuable compounds of versatile applicability. Thus they may for example be used as antioxidants or bactericides. Above all, however, they are suited to the production of polymers, especially to copolymerization with other ethylenically unsaturated compounds. The carboxylic acid arylmethylamides may be converted, in solution or in emulsion and in the presence of catalysts which release free radicals or which act ionically, by themselves or together with other polymerizable compounds, to give polymers which are generally straight chain. Depending on the choice of starting substances one thereupon obtains linear polymer homologues, unipolymers of multipolymers. Polymer homologues are obtained if a single carboxylic acid arylmethylamide is used. Unipolymers are obtained when two or more carboxylic acid arylmethylamides which differ from one another are used, and multipolymers are obtained when at least one carboxylic acid arylmethylamide and at least one other monomer are used. As examples of monomeric compounds which may be used for the production of multipolymers there may be mentioned: vinyl esters of organic acids, for example those of acetic acid, formic acid, butyric acid or benzoic acid, vinyl alkyl ketones such as vinyl methyl ketone, vinyl halides such as vinyl chloride, vinyl fluoride or vinylidene chloride, vinyl aryl compounds such as stryrene and substituted styrenes, for example α-methylstyrene, other derivatives of polymerizable ethylenically unsaturated acids such as vinylpyrrolidone, vinylcarbazole, acrylonitrile, acrylamide, methacrylamide, amides which are further substituted at the nitrogen atom by alkyl groups such as ethyl, methyl, tertiary butyl or hydroxyalkyl groups, for example the N-methylolamides and their ethers, basic amides such as methacrylic acid dimethylaminoethylamide or acrylic acid diethylaminopropylamide and their quaternization products, but especially esters of polymerizable ethylenically unsaturated acids, for example of acrylic acid, methacrylic acid, crotonic acid, maleic acid, fumaric acid or itaconic acid, vinylsulfonic, allylsulfonic or styrenesulfonic acids and mono-alcohols of di-alcohols having one to 18 carbon atoms of hydroxybenzenes, for example methyl methacrylate, ethylacrylate, glycidyl acrylate, butyl acrylate, β-hydroxyethyl acrylate or the corresponding polyglycol esters, dodecyl acrylate, as well as free ethylenically unsaturated acids such as acrylic acid, methacrylic acid, crotonic acid, itaconic acid, maleic acid, fumaric acid, vinylsulfonic acid and allylsulfonic acid, vinylbenzenesulfonic acid, and polymerizable olefines such as isobutylene, butadiene, and 2-chlorobutadiene. Preferred are polymerization products of (a) at least one acid arylmethylamide corresponding to the formula

(12)
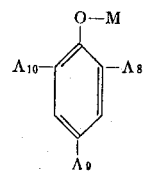

in which M represents a hydrogen atom or a methyl group, $A_8$ represents a member selected from the group consisting of an alkyl radical having at most four carbon atoms, a $CH_2=CH-CO-NH-CH_2-$ and a

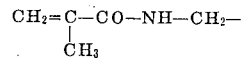

group, $A_9$ represents a member selected from the group consisting of a chlorine atom, an alkyl radical having at most four carbon atoms, a nitro-, methylmercapto-, $CH_2=CH-CO-NH-CH_2-$ and

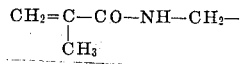

group and $A_{10}$ represents a hydrogen atom or an alkyl radical having at most four carbon atoms (b) at least one other copolymerizable ethylenically unsaturated compound. Preferred comonomers together with component (a) are styrene, an alkyl ester and an alkyl amide of an ethylenically unsaturated polymerizable monocarboxylic acid, vinylidene chloride, acrylonitrile and an ethylenically unsaturated polymerizable monocarboxylic acid.

Of special interest are polymerization products of (a) at least one arylmethylamide corresponding to the formula (8) or (10) and (b) at least one member selected from the group consisting of styrene, vinylidene chloride, an alkylester containing at most 18 carbon atoms in the alkyl group of acrylic or methacrylic acid and an alkylamide containing at most 18 carbon atoms in the alkyl group of acrylic or methacrylic acid. Very suitable polymerization products for stabilizing natural rubber are made from (a) compounds of the formula (6) and (b) another copolymerizable ethylenically unsaturated compound. These copolymers are incorporated into the rubber and the stabilized rubber is then vulcanized at a temperature above 100° C., preferably 120° to 160° C.

The polymers generally consist of 0.1 to 100 percent of a carboxylic acid arylmethylamide or of several such amides, and 99.9 to 0 percent of at least one other polymerizable compound. Depending on the choice of the polymerization conditions the polymers are obtained in solution, as a gel, as an emulsion or as granules. The complete homopolymerization or copolymerization of the carboxylic acid arylmethylamides generally causes no difficulties and the usual methods may be employed. The polymers have a mean molecular weight of 470 to 10,000, preferably 470 to 5,000.

The homopolymers and copolymers form films which adhere well to substrates such as glass or metal so that they may successfully be used in lacquers. Copolymers with long chain alkyl acrylates such as octadecyl acrylate may easily be fused together with polyolefines, for example polyethylene, and are compatible therewith. The polymers may be cross-linked with bifunctional epoxides and then form insoluble films which firmly adhere to surfaces. Suitable epoxides e.g. are the reaction products of epochlorohydrin with 2,2-bis-(4'-hydroxyphenyl)-propane.

The films are made by a process for coating substrates, wherein a solution in an organic solvent of a mixture consisting essentially of
a. a polymerization product as aforedefined
b. an at least bifunctional epoxide and
c. a curing catalyst
is coated on the substrate, and the coated substrate is dried and then cured at a temperature ranging from 100° to 200° C. Suitable organic solvents are benzene, toluene, xylene, chlorobenzene, trichloroethylene, etc. As curing agents there may be used the usual catalysts for curing epoxy resins such as dioctadecyl dimethyl ammonium chloride.

The new carboxylic acid arylmethylamides may be incorporated, for example by copolymerization, into styrene and other plastics so as to act as phenolic stabilizers. This largely avoids blooming out, sweating out or crystallizing out, which is normally a disadvantage of phenolic stabilizers. Good opportunities are also offered by the incorporation of copolymers of phenolic polymerizable antioxidants with such polymerization constituents as assist good compatibility in the substrate (for example octadecyl methacrylate for the case of polyethylene). Carboxylic acid arylmethylamides based on hydroxybenzenes which may be used as bactericides also show a bactericidal effect if copolymerized with other monomers. By using suitable comonomers the polymers may be modified in such a way that they may be fixed on to suitable substrates, for example they may be fixed on to fibrous materials such as cotton by means of the exhaustion method.

In the examples which follow, the parts denote parts by weight and the percentages denote percentages by weight, unless otherwise stated.

EXAMPLE 1

14.3 parts of 2-hydroxynaphthalene, 10.1 parts of acrylic acid methylolamide and 0.1 part thiodiphenylamine are dissolved in 60 parts by volume of absolute ethanol and 6 parts by volume of 37 percent hydrochloric acid is added thereto. The mixture is allowed to stand in a closed vessel for 30 hours. Thereafter, about 600 parts by volume of water are stirred in. A precipitate of about 19.6 parts (86 percent of theory) of the compound of formula (7) is obtained. After recrystallization from benzene, the melting point was 148° C.

Analysis: found:     C 74.10,  H 6.10,  N 5.80
         calculated: C 74.00,  H 5.80,  N 6.10

EXAMPLE 2

Ninety-one parts of acrylic acid methylolamide, 73 parts of 1-hydroxy-2,4-dimethylbenzene and 0.1 part of thiodiphenylamine are dissolved in 500 parts by volume of absolute ethanol and 40 parts by volume of 37 percent hydrochloric acid are added thereto, with the mixture being cooled somewhat. The mixture is then allowed to stand in a closed vessel for 70 hours. The precipitate which has formed is filtered off. Further product is obtained by concentrating the mother liquor. The combined products are washed with a little ethanol followed by water, and are dried. About 72.5 parts (59 percent) of the compound of formula (8) are obtained. After recrystallization from an alcohol-water mixture (2:1) the melting point was 155° C.

Analysis: found: C 70.60, H 7.50, N 6.60;
calculated: C 70.20, H 7.40, N 6.80.

EXAMPLE 3

24.4 parts of 1-hydroxy-2,6-dimethylbenzene and 20.2 parts of acrylic acid methylolamide are dissolved in 110 parts by volume of absolute ethanol, with the addition of 0.1 part of thiodiphenylamine. Twelve parts by volume of 37 percent hydrochloric acid are added and the mixture allowed to stand in a closed vessel for 70 hours. Water is then stirred in and a precipitate of about 21.3 parts (52 percent of theory) of the compound of formula

(13) 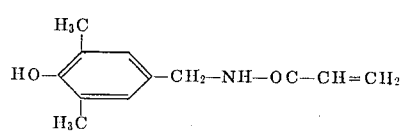

are obtained. After recrystallization from an alcohol-water mixture (1:3) the melting point was 142° C.
Analysis: found: C 70.30, H 7.30, N 6.80;
calculated: C 70.20, H 7.40, N 6.80.

EXAMPLE 4

32.8 parts of 1-hydroxy-2-methyl-4-tert.butylbenzene and 20.2 parts of acrylic acid methylolamide are dissolved in 110 parts by volume of absolute ethanol together with 0.1 part of thiodiphenylamine. Twelve parts by volume of 37 percent hydrochloric acid are added and the mixture allowed to stand in a closed vessel for 70 hours. The mixture is then poured at 0° C., with vigorous stirring, into a mixture of 500 parts of water and 300 parts by volume of petrol ether. About 9.5 parts (19 percent of theory) of the compound of formula

(14) 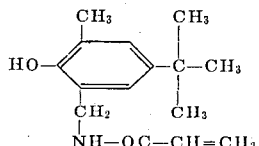

are obtained as a precipitate. After recrystallization from toluene the melting point was 160° C.
Analysis: found: C 73.00, H 8.40, N 5.90;
calculated: C 72.80, H 8.60, N 5.70.

EXAMPLE 5

64.5 parts of 1-hydroxy-4-chlorobenzene and 50.5 parts of acrylic acid methylolamide are, with the addition of 0.1 part of thiodiphenylamine, successively added with cooling to a mixture of 150 parts by volume of pyrophosphoric acid and 350 parts by volume of glacial acetic acid which had been prepared at 15° to 20° C., and in each case the mixture is stirred until everything has dissolved. The mixture is allowed to stand for 70 hours in a closed vessel and is then stirred into 2,500 parts of water. The smeary precipitate which forms is washed with water and after seeding is stirred with water at high speed, whereupon it completely crystallizes. About 71.7 parts (68 percent of theory) of the compound of formula

(15) 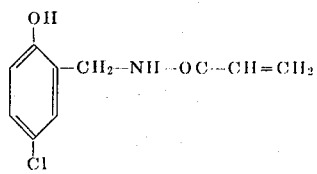

are obtained as a crude product. After three recrystallizations from xylene the melting point is 126° C. The product even then contains slight amounts of 2,6-bis-acrylamidomethyl-4-chlorophenol which is difficult to remove by recrystallization
Analysis: found: C 56.90, H 4.80, N 7.20;
calculated: C 56.70, H 4.80, N 6.60.

EXAMPLE 6

Using a charge containing 1-hydroxy-4-chlorobenzene in accordance with the data of example 5, in 96 percent sulfuric acid as the solvent, the compound of formula

(16) 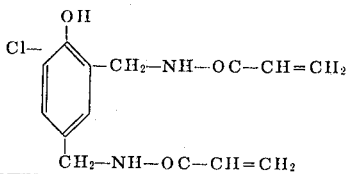

is obtained. After recrystallization from water the melting point is 158° C. (crystals in the form of leaflets).
Analysis: found: C 57.10, H 4.90, N 9.50, Cl 12.20;
calculated: C 57.00, H 5.10, N 9.50, Cl 12.00.

EXAMPLE 7

Using a charge containing 1-hydroxy-3-methyl-4-chlorobenzene, following the method of example 5, an isomer mixture is obtained. Fractional crystallization thereof from benzene yields the substances of formulas

(17) 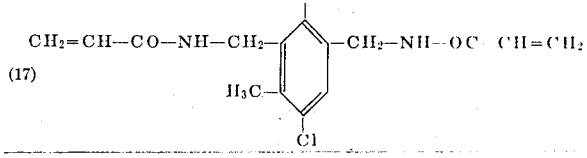

of melting point 190° C.,
Analysis: found: C 58.50, H 5.20, N 9.00, Cl 11.60;
calculated: C 58,30, H 5.50, N 9.10, Cl 11.50,

(18) 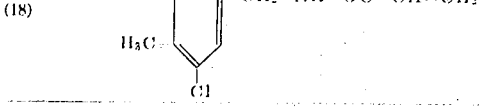

of melting point 183° C.,
Analysis: found: C 58.90, H 5.60, N 6.10, Cl 15.30;
calculated: C 58.50, H 5.40, N 6.20, Cl 15.70.

EXAMPLE 8

Twenty-eight parts of 1-hydroxy-4-nitrobenzene and 20.2 parts of acrylic acid methylolamide are successively dissolved, with cooling, in 80 parts by volume of concentrated sulfuric acid. The mixture is allowed to stand in a closed vessel for 60 hours and then poured on to 500 parts of ice. The resulting precipitate is washed with water and recrystallized from 3,000 parts of water. About 27 parts (61 percent of theory) of the compound of formula

(19) 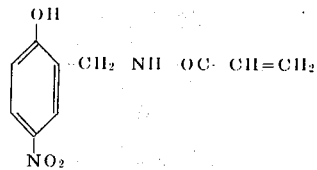

of melting point 168° C. are obtained.
Analysis: found: C 53.60, H 4.50, N 12.70;
calculated: C 54.00, H 4.50, N 12.60.

EXAMPLE 9

Fifty-four parts of the compound of formula (14) are dissolved in 400 parts by volume of acetone. Thirty-five parts of finely powdered anhydrous potassium carbonate are added and 30.8 parts of dimethyl sulfate dissolved in 100 parts by volume of acetone, are added at boiling temperature. The mixture is then boiled for a further 4 hours under reflux. It is then filtered, the solvent removed in vacuo, and the residue stirred with 300 parts by volume of water, with the addition of 200 parts by volume of 2N caustic soda. The product is filtered off and washed until free of alkali. On drying, 47 parts (82 percent of theory) of the compound of formula (9) are obtained. After recrystallization from ethanol or methanol the melting point is 183° to 184° C.
Analysis: found: C 56.20, H 5.20, N 11.80;
calculated: C 55.90, H 5.10, N 11.80.

Examples 10 to 19 are summarized in table I below. The compounds quoted are produced analogously to the compounds of the preceding examples.

TABLE I

| Ex. No. | Starting product | Reaction product | | Method analogous to Ex. No. | Yield, percent | Melting point (°C.) | Calculated | | | | | Found | | | | |
|---|---|---|---|---|---|---|---|---|---|---|---|---|---|---|---|---|
| | | | | | | | C | H | N | S | Cl | C | H | N | S | Cl |
| 10 | 1-hydroxy-2,6-di-tert.butyl-benzene. | (20) | OH, (CH₃)₃C—, —C(CH₃)₃ [a], R | 5 | 94 | 113 | 74.7 | 9.4 | 4.8 | | | 74.7 | 9.5 | 4.5 | | |
| 11[b] | 1-hydroxy-2,6-di-tert.butyl-benzene. | (21) | OH, (CH₃)₃C—, —C(CH₃)₃ [a], R′ | 5 | 88 | 126 | 75.2 | 9.6 | 4.6 | | | 75.3 | 9.6 | 4.5 | | |
| 12 | 1-hydroxy-2-methyl-4-chloro-benzene. | (22) | OH, CH₃—, R, Cl | [a] | 5 | 48 | 139 | 58.4 | 5.4 | 6.2 | | | 58.3 | 5.4 | 6.2 | |
| 13 | 1-hydroxy-2-isopropyl-4-chloro-5-methylbenzene. | (23) | OH, (CH₃)₂CH—, R, CH₃, Cl | [a] | 5 | 87 | 150 | 62.8 | 6.8 | 5.2 | | | 62.8 | 6.9 | 5.2 | |
| 14 | 1-hydroxy-2-nitro-4-chloro-benzene. | (24) | OH, O₂N—, R, Cl | [a] | 8 | 73 | 150 | 46.8 | 3.5 | 10.9 | | | 46.7 | 3.4 | 10.9 | |
| 15[c] | 1-hydroxy-2-methylmercapto-4-methylbenzene. | (25) | OH, H₃C—S—, R, CH₃ | [a] | 2 | | 147 | 60.7 | 6.4 | 5.9 | | | 60.8 | 6.7 | 5.8 | |
| | do | (26) | OH, H₃C—S—, R, R, CH₃ | [a] | 2 | | 224 | 60.0 | 6.3 | 8.7 | 10.0 | | 59.4 | 6.3 | 8.4 | 10.4 |
| 16 | 1-hydroxy-2-methyl-4-methylmercaptobenzene. | (10) | OH, H₃C—, R, S—CH₃ | [a] | 2 | 34 | 146 | 60.7 | 6.4 | 5.9 | 13.5 | | 60.3 | 6.7 | 5.8 | 13.2 |
| 17 | Salicylic acid | (27) | R—, —COOH, —OH | [a] | 8 | 10 | 162 | 59.7 | 5.0 | 6.3 | | | 60.1 | 5.1 | 6.2 | |
| 18 | 1,3-dihydroxy-4-chlorobenzene. | (28) | HO—, —OH, Cl—, R | [a] | 1 | 10 | 187 | 52.7 | 44. | 6.1 | | 15.6 | 52.4 | 4.2 | | | 15.7 |

TABLE I—Continued

| Ex. No. | Starting product | Reaction product | | Method analogous to Ex. No. | Yield, percent | Melting point (° C.) | Calculated | | | | | Found | | | | |
|---|---|---|---|---|---|---|---|---|---|---|---|---|---|---|---|---|
| | | | | | | | C | H | N | S | Cl | C | H | N | S | Cl |
| 19....[b] | 1-Hydroxy-2,4-dimethylbenzene. | (11) 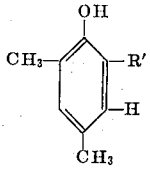 | 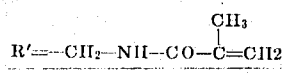 | [a] 1 | 44 | 110 | 71.2 | 7.8 | 6.4 | | | 70.6 | 7.8 | 6.4 | | |

NOTES ON TABLE I:

a. R=—CH$_2$—NH—CO—CH=CH$_2$;

R'=—CH$_2$—NH—CO—$\overset{\text{CH}_3}{\underset{}{\text{C}}}$=CH$_2$ b. These substances may be produced both using N-hydroxymethylmethacrylamide or using N-methoxymethylmethacrylamide. The latter process gives better yields.

c. The compounds of formulas (25) and (26) quoted in example 15 are produced alongside one another in the same charge and are separated by fractional crystallization from methanol.

EXAMPLE 20

A solution of 5 parts of styrene and 5 parts of the compound of formula (7) and 31 parts of 1,2-dichlorethane is heated to 70° C. with stirring and with nitrogen being passed in, and is treated with a solution of 0.1 part of azodiisobutyronitrile in 2.5 parts of 1,2-dichlorethane. After 30 minutes a solution of 0.1 part of azodiisobutyronitrile in 2.5 parts of 1,2-dichlorethane is again added and the solution kept at 70° C. for 17 hours. In order to test for complete polymerization the polymer is precipitated from the cooled solution by means of petrol ether, filtered off, washed, dried and digested, in a finely powdered state, with 2N caustic soda for 30 minutes. The polymer is filtered off and the filtrate adjusted to pH 1.5 by means of 2N hydrochloric acid. No precipitate forms. The monomer of formula (7) which is easily soluble in 2N caustic soda and which immediately precipitates on acidification, is quantitatively copolymerized.

EXAMPLE 21

If 2 parts of the compound of formula (7) are polymerized in 8 parts of 1,2-dichlorethane by means of 0.02 parts of azodiisobutyronitrile, following the instructions of example 20, then a film-forming homopolymer is again obtained, which is insoluble in 2N caustic soda and contains no monomeric components.

EXAMPLE 22

A copolymer in which no monomer of formula (7) could be detected by means of 2N caustic soda is obtained from 38 parts of styrene, 10 parts of butyl n-acrylate and 2 parts of the compound of formula (6) in 115 parts of benzene, using one part of azodiisobutyronitrile.

EXAMPLE 23

If the reaction described in example 22 is carried out with 39 parts of vinylidene chloride, 10 parts of n-butyl acrylate and 1 part of the compound of formula (7), then a polymer is again obtained which contains no residual monomer of formula (7).

EXAMPLE 24

If 3 parts of the compound of formula (7) and 7 parts of stearyl methacrylate are polymerized in 11 parts of n-butyl alcohol by means of 0.2 parts of tert. butyl peroctoate for 10 hours at 85° C., a copolymer is obtained which is compatible with polyethylene in amounts of up to 10 percent, both in the melt and in films.

EXAMPLE 25

If 15 parts of styrene, 7.5 parts of n-butyl acrylate and 2.5 parts of the compound of formula (7) are polymerized for 24 hours at 75° C. in 25 parts of n-butyl alcohol by means of 0.6 parts of azodiisobutyronitrile, a polymer is obtained which forms very well adhering films on glass and metal.

EXAMPLE 26

Polymerization of 2.5 parts of the compound of formula (8) and 4.6 parts of stearyl methacrylate in 7.7 parts of benzene at 90° C. over the course of 20 horus, using 0.14 parts of azodiisobutyronitrile, yields a copolymer which is up to 10 percent compatible with polyethylene both as a melt and as a film.

EXAMPLE 27

Polymerization of 1 part of the compound of formula (8) and 10 parts of lauryl methacrylate in 8 parts of benzene by means of 0.5 parts of benzoyl peroxide over the course of 24 hours yields a copolymer which is up to 8 percent compatible with polyethylene both as a melt and as a film.

EXAMPLE 28

Thirty-eight parts of styrene, 10 parts of n-butyl acrylate and two parts of a compound of formula (8) in 115 parts of benzene in the course of 24 hours at 75° C. by means of 1 part of azodiisobutyronitrile yield a copolymer, treatment of which with 2N caustic soda does not show any compound of formula (8) to be present.

EXAMPLE 29

Thirty-eight parts of styrene, 10 parts of n-butyl acrylate and 2 parts of the compound of formula (13) in 115 parts of benzene at 75° C. over the course of 66 hours yield, with 1 part of azodiisobutyronitrile, a copolymer which contains no monomer of formula (13).

EXAMPLE 30

Thirty-eight parts of styrene, 10 parts of n-butyl acrylate and 2 parts of the compound of formula (14) in 115 parts of benzene at 75° C. over the course of 65 hours yield, by means of 1 part of azodiisobutyronitrile, a copolymer, treatment of which with 2N caustic soda does not show any monomer of formula (14) to be present.

EXAMPLE 31

Three parts of the compound of formula in 4 parts of benzene at 80° C. over the course of 60 minutes yield, with 0.06 parts of azodiisobutyronitrile, a gel which is insoluble in all organic solvents.

EXAMPLE 32

If a solution of 1.25 parts of the compound of formula (19) and 3.75 parts of acrylamide in 23 parts of dimethylformamide is polymerized by means of 0.08 parts of azodiisobutyronitrile at 65° C. over the course of 15 hours, a copolymer precipitates which is completely precipitated by means of ether, filtered off, washed with ether and dried. Yield, about 5 parts. The monomer (14) cannot be detected in the polymer by fractional precipitation from dimethylformamide by means of ether. The polymer forms a clear yellowish film from aqueous solution.

EXAMPLE 33

37.5 parts of n-butyl acrylate, 5 parts of acrylonitrile, 2.5 parts of acrylic acid, 15 parts of methylene chloride and 5 parts of a compound of formula (8) are preemulsified in a solution of 2.5 parts of sodium laurylsulfonate in 70 parts of water, warmed to 65° C. with stirring and with nitrogen being passed in, and treated with a solution of 0.2 part of potassium persulfate in 5 parts of water and a solution of 0.05 parts of sodium metabisulfite in 5 parts of water. Sixty minutes later, a solution of 0.2 parts of potassium persulfate in 5 parts of water and a solution of 0.05 parts of sodium metabisulfite in 5 parts of water are added, and the mixture allowed to postpolymerize for 4 hours. After cooling to room temperature, the mixture is adjusted to a pH value of 7 by means of 10 percent strength aqueous ammonia. It is then warmed to 70° C. and the methylene chloride flushed out by means of nitrogen. On cooling and filtration, an emulsion having a resin content of about 34 percent is obtained.

EXAMPLE 34

Instead of the compound of formula (8), 5 parts of a compound of formula (20) are used in the process described in example 33, but with the difference that 85 parts of water are used to dissolve the sodium laurylsulfonate and that an emulsion of about 32 percent resin content is obtained.

The table II which follows summarizes examples 35 to 62.

NOTES ON TABLE II:

The polymers are precipitated from the solution, and washed, by means of (1) petrol ether (2) ether and (3) water. In the other examples the polymers are obtained in a solid form by distilling off the solvent in vacuo.

*) Polymerizable compound which absorbs ultraviolet radiation, of formula

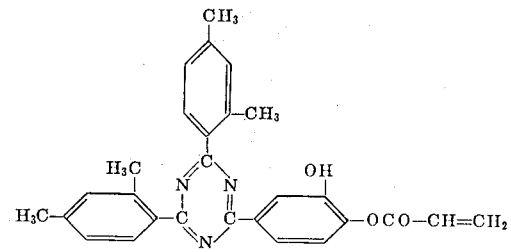

B = benzene
DMF = dimethylformamide
BA = n-butyl alcohol
ADBN = azodiisobutyronitrile
AHBP = tert.-butyl perester of 2-ethylhexanoic acid.

TABLE II

| Example No. | Monomers | Parts | Solvent | Parts | Catalyst | Parts | Polymerisation Temp. (° C.) | Time (hours) |
|---|---|---|---|---|---|---|---|---|
| 35 | Compound of Formula (8) / Stearyl methacrylate | 10 / 15 | B | 120 | ADBN | 0.8 | 85 | 12 |
| 36 | Compound of Formula (8) / n-Butyl methacrylate | 10 / 15 | B | 120 | ADBN | 0.5 | 85 | 12 |
| 37 | Compound of Formula (8) / Styrene | 10 / 15 | B | 120 | ADBN | 0.8 | 85 | 12 |
| 38 | Compound of Formula (20) / Stearyl methacrylate | 10 / 15 | B | 35 | ADBN | 0.8 | 85 | 12 |
| 39 | Compound of Formula (20) / Stearyl methacrylate | 10 / 10 | B | 35 | ADBN | 0.8 | 85 | 12 |
| 40 | Compound of Formula (20) / n-Butyl methacrylate | 10 / 10 | B | 35 | ADBN | 0.5 | 85 | 12 |
| 41 | Compound of Formula (20) / n-Butyl methacrylate | 10 / 15 | B | 35 | ADBN | 0.5 | 85 | 12 |
| 42 | Compound of Formula (20) / Styrene | 10 / 15 | B | 35 | ADBN | 0.8 | 85 | 12 |
| 43 | Compound of Formula (10) / Stearyl methacrylate | 10 / 15 | B | 130 | ADBN | 0.8 | 85 | 12 |
| 44 | Compound of Formula (10) / Styrene | 10 / 15 | B | 100 | ADBN | 0.8 | 85 | 12 |
| 45 | Compound of Formula (10) / n-Butyl methacrylate | 10 / 15 | B | 130 | ADBN | 0.8 | 85 | 12 |
| 46 | Compound of Formula (20) / Compound of Formula (*) / Stearyl methacrylate | 5 / 5 / 10 | B | 28 | ADBN | 0.6 | 85 | 12 |
| 47 | Compound of Formula (11) / Methyl methacrylate | 10 / 10 | B | 80 | ADBN | 0.4 | 85 | 12 |
| 48 | Compound of Formula (8) | 10 | B | 120 | ADBN | 0.16 | 85 | 15 |
| 49 | Compound of Formula (21) / Stearyl methacrylate | 10 / 10 | B | 27 | AHBP | 1.4 | 85 | 20 |
| 50 | Compound of Formula (21) / Methyl methacrylate | 10 / 10 | B | 27 | AHBP | 1.4 | 85 | 20 |
| 51 | Compound of Formula (21) / Styrene | 10 / 10 | B | 27 | AHBP | 1.4 | 85 | 30 |
| 52 | Compound of Formula (22) | 10 | B | 120 | ADBN | 0.4 | 75 | 20 |

Table II—Continued

| Example No. | Monomers | Parts | Solvent | Parts | Catalyst | Parts | Polymerisation Temp. (°C.) | Time (hours) |
|---|---|---|---|---|---|---|---|---|
| 53 | Compound of Formula (9) | 10 | DMF | 25 | AHBP | 2 | 80 | 40 |
|  | n-Butyl methacrylate | 10 |  |  |  |  |  |  |
| 54 | Compound of Formula (8) | 10 | DMF | 105 | ADBN | 0.6 | 75 | 18 |
|  | Acrylamide | 10 |  |  |  |  |  |  |
| 55 | Compound of Formula (8) | 10 | DMF | 105 | ADBN | 0.6 | 75 | 18 |
|  | N-tert.-butyl acrylamide | 10 |  |  |  |  |  |  |
| 56 | Compound of Formula (10) | 10 | DMF | 100 | ADBN | 0.4 | 65 | 12 |
|  | N-tert.-butyl acrylamide | 10 |  |  |  |  |  |  |
| 57 | Compound of Formula (10) | 10 | DMF | 100 | ADBN | 0.4 | 65 | 12 |
|  | Acrylamide | 10 |  |  |  |  |  |  |
| 58 | Compound of Formula (20) | 10 | DMF | 100 | ADBN | 0.4 | 65 | 12 |
|  | Acrylamide | 10 |  |  |  |  |  |  |
| 59 | Compound of Formula (20) | 10 | DMF | 100 | ADBN | 0.4 | 65 | 12 |
|  | N-tert.-butylacrylamide | 10 |  |  |  |  |  |  |
| 60 | Compound of Formula (7) | 6 | BA | 22 | ADBN | 0.4 | 85 | 20 |
|  | Stearyl methacrylate | 14 |  |  |  |  |  |  |
| 61 | Compound of Formula (13) | 6 | BA | 22 | ADBN | 0.6 | 85 | 20 |
|  | Stearyl methacrylate | 14 |  |  |  |  |  |  |
| 62 | Compound of Formula (10) | 10 | B | 130 | ADBN | 0.45 | 75 | 42 |

EXAMPLE 63

One part each of the polymers listed in table III below are dissolved in 2 parts of benzene, treated with an epoxy-resin (reaction product of epichlorohydrin and 2,2-bis(4'-hydroxyphenyl)-propane) which contains 5.5 equivalents of epoxy-groups and with dioctadecyl dimethyl ammonium chloride as catalyst, and are cast into films. The films, which are dried at room temperature, are set for 10 minutes at 170° C.

Table III

| Polymer according to Exampl No. | Epoxy resin, mg. | Catalyst, mg. | Solubility in perchorethylene |
|---|---|---|---|
| 26 | 95 | 25 | Insoluble. |
| 35 | 90 | 25 | Do. |
| 58 | 95 | 25 | Do. |
| 59 | 110 | 25 | Do. |
| 58 |  |  | Soluble. |

EXAMPLE 64

Stabilization of Natural Rubber again Heat Ageing

Preparations of the following composition, in parts by weight, were shaped into sheets of size 15 cm. × 15 cm. × 0.2 cm. and given optimum vulcanization at 141°C.:

Natural rubber (pale crepe) 100; zinc oxide 5; titanium dioxide 10; barium sulfate 75; stearic acid 1; N-cylcohexyl-2-benzthiazylfonamide 0.5; sulfur 2; antioxidant 1 (or 0, in one experiment)

THe samples were aged for 14 days at 70° C.

| Polymeric antioxidant according to example | — | 35 | 37 | 38 | 39 |
|---|---|---|---|---|---|
| Duration of vulcanization (minutes) | 18 | 18 | 18 | 18 | 18 |
| Tensile strength (ZF) kg./cm.² | 238 | 228.5 | 228.5 | 204.5 | 196 |
| Extension at break (ZD) in % | 590 | 550 | 570 | 570 | 540 |
| Reduction of ZF on ageing, in % | 29 | 17 | 17 | 5 | 19 |
| Reduction of ZD on ageing, in % | 5 | 0 | 0 | 5 | 0 |

EXAMPLE 65

A mixture of 100 parts of unstabilized polypropylene and 0.5 parts of one of the compounds of examples 10, 11, 39, 40, 49, 50, 51 and 62 is converted to a foil on a calendar at 170° C. This foil is subsequently pressed to a sheet 1 mm. thick at 230° to 240° C. and a pressure of 40 kg./cm². The sheet so obtained is then cut into small pieces. Ten grams thereof are brought into contact with pure oxygen (pressure 70 cm. Hg) at exactly 160° C. in a reaction flask equipped with an absolute monometer. The drop of oxygen pressure with time is then measured, the measurements always being carried out at constant volume. Sigmoid-shaped curves of oxygen consumption are thus obtained. The time up to the steep rise of the curves is described as the induction period.

The following results were obtained:

Table IV

| Polypropylene | Induction period (hours) |
|---|---|
| Without additives | 0.5 |
| Plus compound according to Example: |  |
| (Monomer) 10 | 24.5 |
| (Monomer) 11 | 39 |
| (Polymer) 39 | 7.2 |
| (Polymer) 40 | 14.3 |
| (Polymer) 49 | 6.9 |
| (Polymer) 50 | 24.5 |
| (Polymer) 51 | 28 |
| (Polymer) 62 | 25.5 |

EXAMPLE 66

In order to test the stability and adhesion on dry cleaning (chlorinated hydrocarbons) as practiced with polypropylene fibers, the following is carried out: the dry cleaning process is simulated by an extraction experiment in which the small pieces of polypropylene referred to in example 65 are treated for 30 minutes in a bath of trichlorethylene at 30° C. The pieces which have been thus treated are then again subjected to the oxygen uptake test as described in example 65. The permanence of the antioxidants in the substrate is deduced from the change in induction period before and after the extraction experiment. In this test, polymeric antioxidants appear to be of advantage as may be seen from the following numerical examples:

Table V

| Polypropylene | Induction period (hours) | |
|---|---|---|
| | Before treatment | After treatment |
| Without additive | 0.5 | 0.5 |
| Plus polymeric compound according to Example 51 | 28 | 25 |
| Plus monomeric compound according to Example 11 | 39 | 18 |

What is claimed is:
1. A carboxylic acid arylmethylamide corresponding to the formula

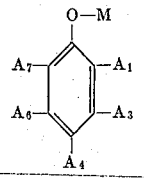

in which M represents a hydrogen atom or a methyl group, $A_1$ represents a member selected from the group consisting of a $$CH_2=CH-CO-NH-CH_2-,$$

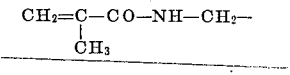

HOOC—
and an alkyl radical having at most four carbon atoms, $A_3$ and $A_6$ each represents a member selected from the group consisting of a hydrogen atom and an alkyl radical having at most four carbon atoms, a chlorine atom, a nitro- or methylmercapto group, $A_7$ represents a member selected from the group consisting of a hydrogen atom, a chlorine atom, an alkyl radical having at most four carbon atoms, a nitro-, methylmercapto-, hydroxyl-, $$CH_2=CH-CO-NH-CH_2-\text{ and}$$

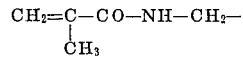

group, $A_3$ and $A_4$ together may make up a condensed-on benzene ring, at least one of the substituents $A_1$ and $A_7$ being a $$CH_2=CH-CO-NH-CH_2-\text{ or a}$$

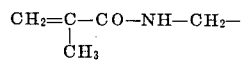

group.

2. A carboxylic acid arylmethylamide according to claim 1 corresponding to the formula

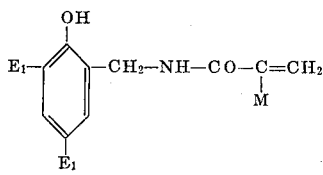

in which M represents a hydrogen atom or a methyl group and $E_1$ is an alkyl radical having at most four carbon atoms or a methylmercapto group, not more than one $E_1$ representing a methylmercapto group.

3. A carboxylic acid arylmethylamide according to claim 1 corresponding to the formula

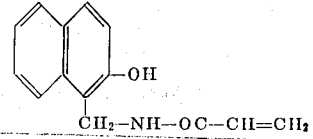

4. A carboxylic acid arylmethylamide according to claim 1 corresponding to the formula

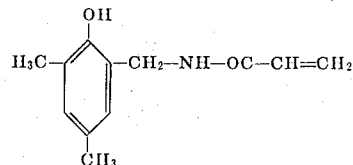

5. A carboxylic acid arylmethylamide according to claim 1 corresponding to the formula

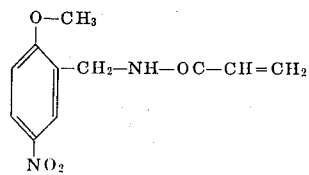

6. A carboxylic acid arylmethylamide according to claim 1 corresponding to the formula

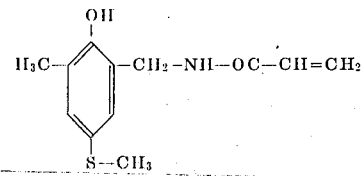

7. A carboxylic acid arylmethylamide according to claim 1 corresponding formula the formula

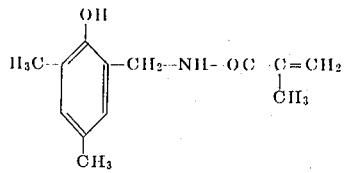

8. A compound according to claim 1 corresponding to the formula:

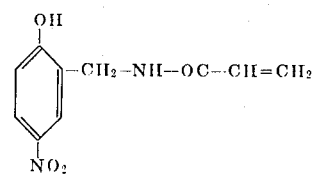

UNITED STATES PATENT OFFICE
CERTIFICATE OF CORRECTION

Patent No. 3,627,831          Dated December 14, 1971

Inventor(s) Helmut Huber-Emden et al

It is certified that error appears in the above-identified patent and that said Letters Patent are hereby corrected as shown below:

Column 17, claim 1, line 35, after "four carbon atoms,", insert --- $A_4$ represents a member selected from the group consisting of an alkyl radical containing at most 4 carbon atoms, ---.

Column 18, claim 7, "corresponding formula the formula" should read -- corresponding to the formula --.

Signed and sealed this 11th day of July 1972.

(SEAL)
Attest:

EDWARD M. FLETCHER, JR.
Attesting Officer

ROBERT GOTTSCHALK
Commissioner of Patents